(No Model.)  2 Sheets—Sheet 1.
P. CONTANT.
SAMPLING TUBE.
No. 293,423.  Patented Feb. 12, 1884.
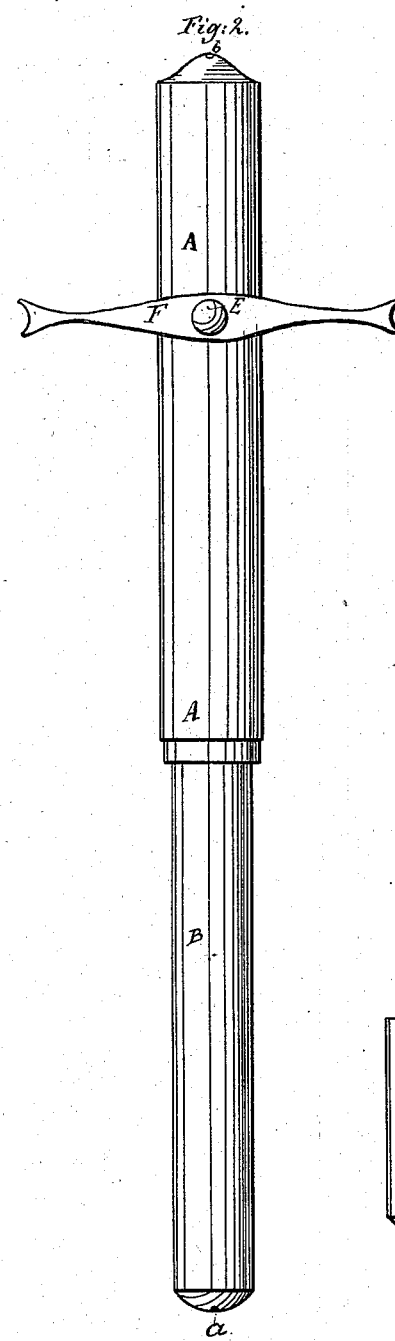
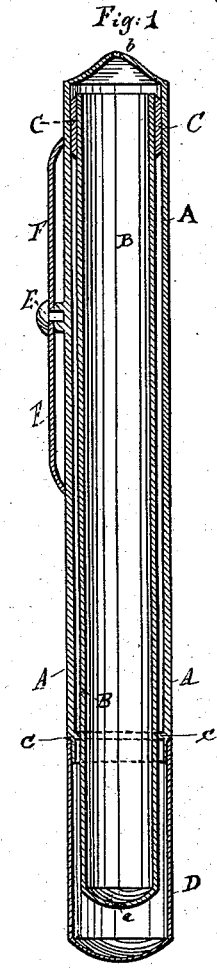
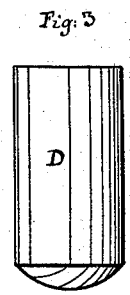
Witnesses
N. S. Boulter
G. W. Knotts
Inventor
Paul Contant
pr Henry Orth

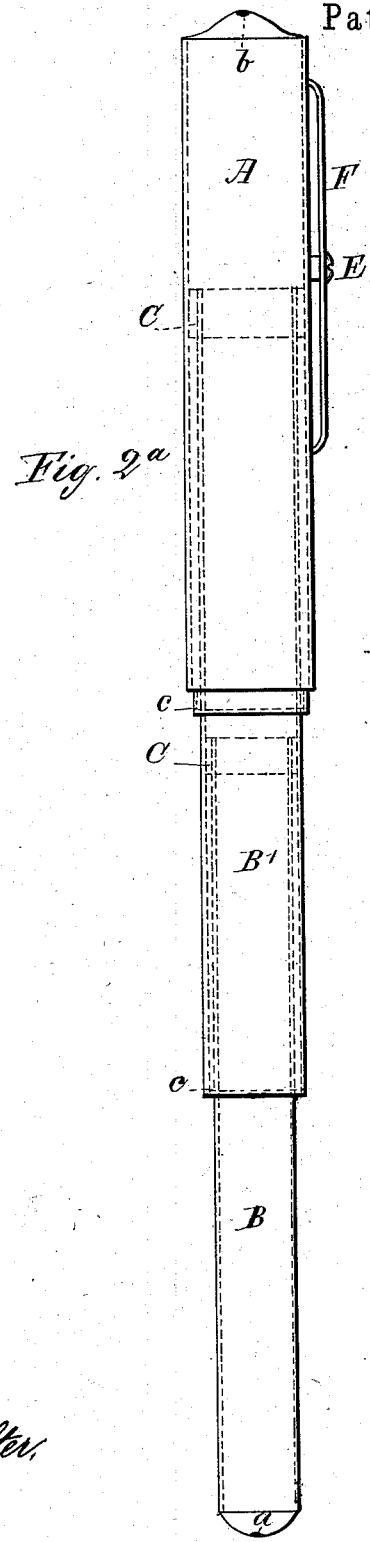

UNITED STATES PATENT OFFICE.

PAUL CONTANT, OF REIMS, FRANCE.

SAMPLING-TUBE.

SPECIFICATION forming part of Letters Patent No. 293,423, dated February 12, 1884.

Application filed June 18, 1883. (No model.) Patented in France November 13, 1882, No. 152,017.

*To all whom it may concern:*

Be it known that I, PAUL CONTANT, of the city of Reims, in the Republic of France, a citizen of said Republic of France, have invented certain new and useful Improvements in Sampling-Tubes, (for which I have obtained Letters Patent in France under date of November 13, 1882, No. 152,017;) and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to that class of instruments employed for sampling or testing liquids; and it has for its object to provide an instrument of the desired length and so constructed as to adapt it to be carried in the pocket, whereby the objections to using the sampling-tubes usually kept by dealers or growers are avoided, as each purchaser may provide himself with his own sampling-tube.

The invention consists in the construction and combination of the parts that constitute the instrument, substantially as hereinafter fully described, and as shown in the accompanying drawings, in which—

Figure 1 is a vertical longitudinal section, showing the instrument in its closed form. Figs. 2 and 2ª show the instrument in elevation as fully and partly drawn out, and Fig. 3 is a like view of the thimble or cap that serves to inclose the tube-sections and as a testing-cup.

The instrument may be composed of several tubes or sections arranged to telescope one into the other, as shown in Fig. 2ª, the number of such tubes being determined by the length the instrument is to have. As an illustration, I have in the accompanying drawings shown the same as composed of two tubes—an outer tube, A, provided with a small suction-orifice at one end $b$, and an inner tube, B, provided with a like orifice, $a$, said tube B sliding within the tube A—a tight joint being made between the two tubes by means of a packing-ring, C, of rubber or other suitable material. The tubes may be made of metal, glass, or other suitable substance, or of a combination of such substances.

To prevent the inner tube from being accidentally drawn out of the outer tube, the latter is or may be provided at its open end with a flange, $c$, against which the packing-ring will impinge when the tube B is drawn out of the tube A, and prevent further movement of said tube B.

To prevent the sampling-tube from slipping into a cask when introduced into the bunghole thereof, I provide the tube A with a projection or projections at right angles to the axis of the tube of any convenient form, and I preferably arrange these so as to fold close upon the tube A. As shown, an arm or lever, F, pivoted to the tube A at a point, E, equidistant from its extremities, whereby it may be turned at right angles to the longitudinal axis of the tube, as shown in Fig. 2, or folded alongside thereof, as shown in Fig. 1, out of the way.

When the instrument or its inner tube or tubes is or are made of glass, it is desirable that means should be provided to prevent the breaking of the ends of the inner tubes that project beyond the end of the outer tube, A, that performs the function of an inclosing-case for said inner tube or tubes. It is also desirable that the person using the instrument should be provided with a vessel for tasting the liquid, and thereby avoid the use of the glass or other vessel usually tendered by the dealer or grower. To effect this double purpose I provide a cap or cup, D, that fits upon the outer end of the tube A, and incloses the ends of the inner tube or tubes projecting therefrom, said cap or cup serving as a testing-cup at the same time.

The operation of the instrument need not be particularly described, as it is too well known, and differs only from other instruments of this class, in that it has first to be drawn out to its full length after removal of the cap or cup D and the transfer of the contents or part of the contents of the instrument to said cup or cap after the liquid is drawn into the instrument by suction, as usual.

Having described my invention, what I claim is—

1. A sampling-tube adapted to be telescoped and provided with a testing-cup, substantially as described, for the purposes specified.

2. A sampling-tube composed of tube-sections arranged to telescope into one another, the end sections being provided with suction-orifices for drawing in the liquid to be sampled, substantially as described, for the purposes specified.

3. A sampling-tube composed of tube-sections arranged to telescope one into the other and provided with a holding device pivoted to the outer tube and adapted to be set at right angles thereto to form a projection or projections to hold the instrument when inserted in the bung-hole of a cask, as described.

In witness whereof I, the said PAUL CONTANT, have hereunto set my hand in the presence of two subscribing witnesses.

PAUL CONTANT.

Witnesses:
JOHN L. FRISBIE,
CH. JARVIS.